United States Patent [19]
Malcolm

[11] Patent Number: 6,006,204
[45] Date of Patent: Dec. 21, 1999

[54] CORRELATING TRANSACTION RECORDS VIA USER-SPECIFIED IDENTIFIER CREATING UNCLEARED TRANSACTION

[75] Inventor: Jerry Walter Malcolm, Austin, Tex.

[73] Assignee: International Business Machines Corporation, Armonk, N.Y.

[21] Appl. No.: 08/993,511

[22] Filed: Dec. 18, 1997

[51] Int. Cl.$^6$ .................................................. G06F 17/00
[52] U.S. Cl. ................................ 705/30; 705/35; 705/37; 345/326; 345/329; 345/331
[58] Field of Search .................................. 705/30, 35, 37, 705/39, 1; 345/326, 329, 331

[56] References Cited

U.S. PATENT DOCUMENTS

| | | | |
|---|---|---|---|
| 5,093,787 | 3/1992 | Simmons ................................. | 705/33 |
| 5,220,501 | 6/1993 | Lawlor et al. .......................... | 364/408 |
| 5,422,468 | 6/1995 | Abecassis .............................. | 235/380 |
| 5,649,115 | 7/1997 | Schrader et al. ....................... | 705/33 |

*Primary Examiner*—Thomas R. Peeso
*Attorney, Agent, or Firm*—Jeffrey S. LaBaw; Daniel E. Venglarik; Andrew J. Dillon

[57] ABSTRACT

A financial institution customer is permitted to create an uncleared transaction record within the financial institution's account ledger for the customer in anticipation of actually making the transaction. Although maintained within the financial institutions electronic records for the account and appearing on monthly statements or printed transaction histories, uncleared transaction records are treated as account comments but the financial institution and are not employed in any manner to modify the account balance for the corresponding account. The uncleared transaction record may include a detailed description of the transaction as well as a unique transaction identifier, created by the customer or preprinted on a banking form such as a deposit slip. When the transaction is actually made, the real transaction record is annotated with the transaction identifier. Uncleared transaction records may subsequently be correlated to real transaction records utilizing the transaction identifiers during reconciliation. During reconciliation, corresponding uncleared and real transaction records may be merged with the transaction description within the uncleared transaction record appended to the transaction description in the real transaction record. Transaction records may be automatically merged or presented in pairs for manual merger.

20 Claims, 5 Drawing Sheets

CORRELATING TRANSACTION RECORDS VIA USER-SPECIFIED IDENTIFIER CREATING UNCLEARED TRANSACTION

BACKGROUND OF THE INVENTION

1. Technical Field

The present invention relates in general to electronic banking and in particular to reconciling account transactions in electronic banking. Still more particularly, the present invention relates to creation and reconciliation of uncleared transactions in a bank ledger for a customer account utilizing electronic banking.

2. Description of the Related Art

Electronic banking systems are being developed for and utilized by an increasingly large portion of the banking industry. In particular, efforts are being made—by the consortium Integrion, for example—to advance electronic banking services over the Internet for "Web-based" banking. Using such Web-based banking, customers may access their account within a financial institution (bank, credit union, etc.) for bill payment, account reconciliation, and other purposes.

The ledger currently available to consumers for Web-based banking is essentially the "cleared" or "scheduled" transactions. Cleared transactions are those which have completed the clearinghouse function and been posted to a customer's account, while scheduled transactions are those which have been cleared but have not yet been posted. Financial institutions provide no means for including ledger entries for anticipated transactions, such as a deposit which the customer has prepared but which will be actually taken to the bank later.

It is not currently possible, for example, for a Customer to employ an anticipated or uncleared transaction in reconciling the account. With personal finance managers, however, such as Quicken or Microsoft Money, transactions may be entered into a local ledger with an identifier of the transaction type, such as "Deposit of reimbursement check." The actual transaction may occur later, as when the deposit is made the next day. The information may be entered at the time the transaction is prepared, and no further action is required after the transaction actually occurs until the customer is ready to reconcile the local ledger with a bank statement. When reconciliation is undertaken, the personal finance manager may provide assistance in correlating transactions from a local ledger with the amounts in the bank statement.

For Web-based banking, there is generally no ability for customers to alter the online ledger to include information regarding a transaction which has not yet been submitted. Even if there were, when the transaction actually occurs the financial institution will typically enter a generic description, such as "Deposit" or perhaps "Walk-up Teller Deposit," in the account ledger, At reconciliation, this provides little benefit to the customer attempting to correlate the cleared, real transaction with an uncleared or anticipated transaction for the purposes of merging the transaction records. Unless the customer continues to keep paper notes of deposits or withdrawals, the customer is left to match amounts and/or attempt to identify unmatched transactions having the closest dates. This may be an extremely time-consuming and error-prone process.

It would be desirable, therefore, to provide customers with a mechanism for creating transaction records for anticipated transactions. It would further be advantageous if the mechanism included the capability for automatic correlation with real transaction records.

SUMMARY OF THE INVENTION

It is therefore one object of the present invention to provide an improved method and apparatus for electronic banking.

It is another object of the present invention to provide an improved method and apparatus for reconciling account transactions in electronic banking.

It is yet another object of the present invention to provide a method and apparatus for creation and reconciliation of uncleared transactions in a bank ledger for a customer account utilizing electronic banking.

The foregoing objects are achieved as is now described. A financial institution customer is permitted to create an uncleared transaction record within the financial institution's account ledger for the customer in anticipation of actually making the transaction. Although maintained within the financial institutions electronic records for the account and appearing on monthly statements or printed transaction histories, uncleared transaction records are treated as account comments but the financial institution and are not employed in any manner to modify the account balance for the corresponding account. The uncleared transaction record may include a detailed description of the transaction as well as a unique transaction identifier, created by the customer or preprinted on a banking form such as a deposit slip. When the transaction is actually made, the real transaction record is annotated with the transaction identifier. Uncleared transaction records may subsequently be correlated to real transaction records utilizing the transaction identifiers during reconciliation. During reconciliation, corresponding uncleared and real transaction records may be merged with the transaction description within the uncleared transaction record appended to the transaction description in the real transaction record. Transaction records may be automatically merged or presented in pairs for manual merger.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein;

DETAILED DESCRIPTION OF THE PREFERRED EMBODIMENT

Figure 1:
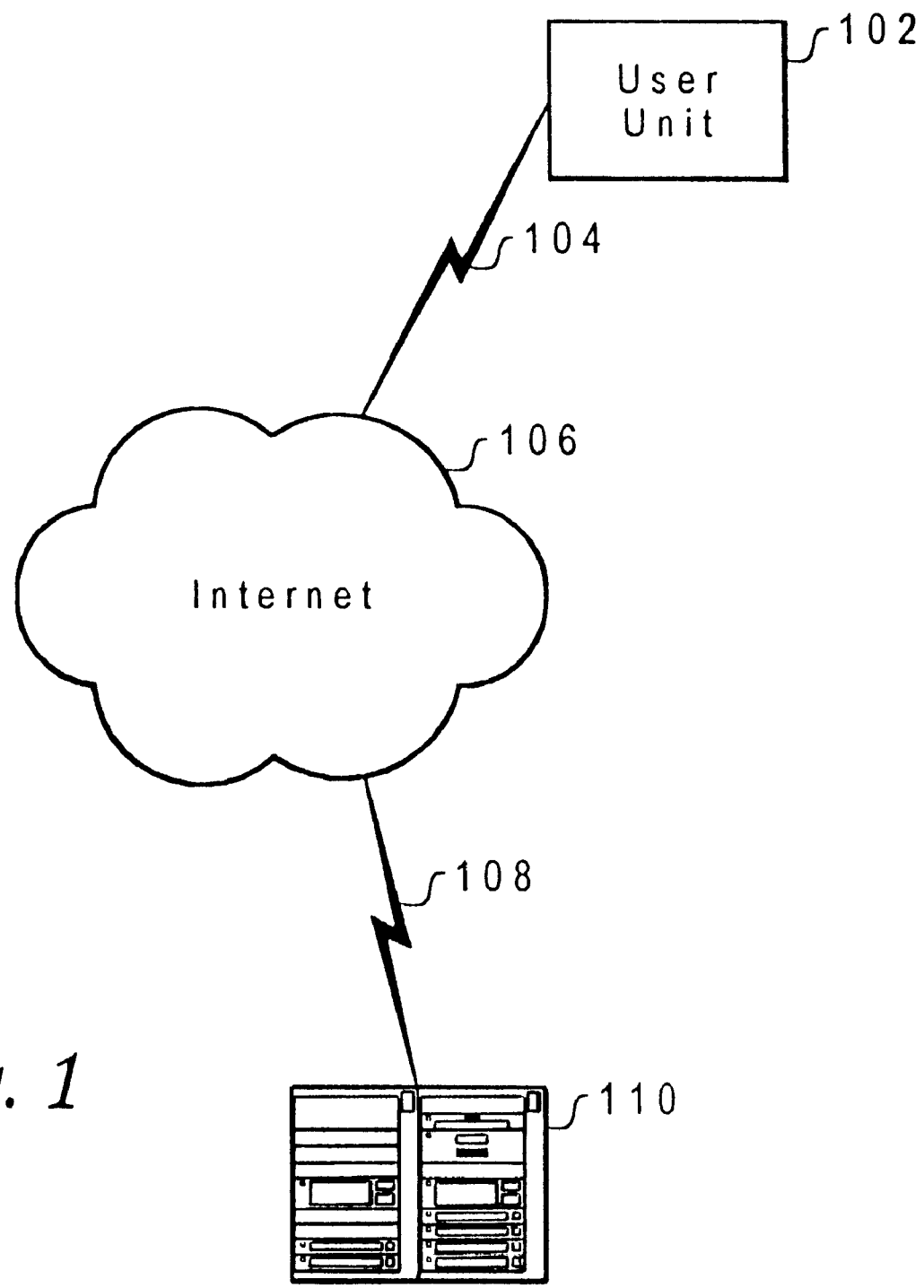
FIG. 1 depicts a network of data processing systems in which a preferred embodiment of the present invention may be implemented.

With reference now to the figures, and in particular with reference to FIG. 1, a network of data processing systems in which a preferred embodiment of the present invention may be implemented is depicted. The exemplary embodiment depicted includes a client 102 connected via communications link 104 to the Internet 106. Communications link 104 may, for example, be in the form of access provided directly by an Internet service provider (ISP) or indirectly via a proxy within a firewall, as is known in the art. Client 102 includes a Java-enabled browser application, allowing client 102 to retrieve and display information formatted in accordance with the HyperText Markup Language (HTML) and to run Java applets, or a Java interpreter, allowing client 102 to execute Java applications.

Also connected to Internet 106, via communications link 108, is server 110. Server 110 may be a World Wide Web (WWW, often simply referred to as "the Web") server capable of receiving and serving HyperText Transmission Protocol (HTTP) requests. Client 102 may thus retrieve HTML-formatted data from server 110 and display such information, executing Java applications or applets, or applications written in other object-oriented languages, in connection with such retrieval and/or display. Java applets thus executed may created and/or reconcile uncleared transactions in accordance with the present invention.

Figure 2:
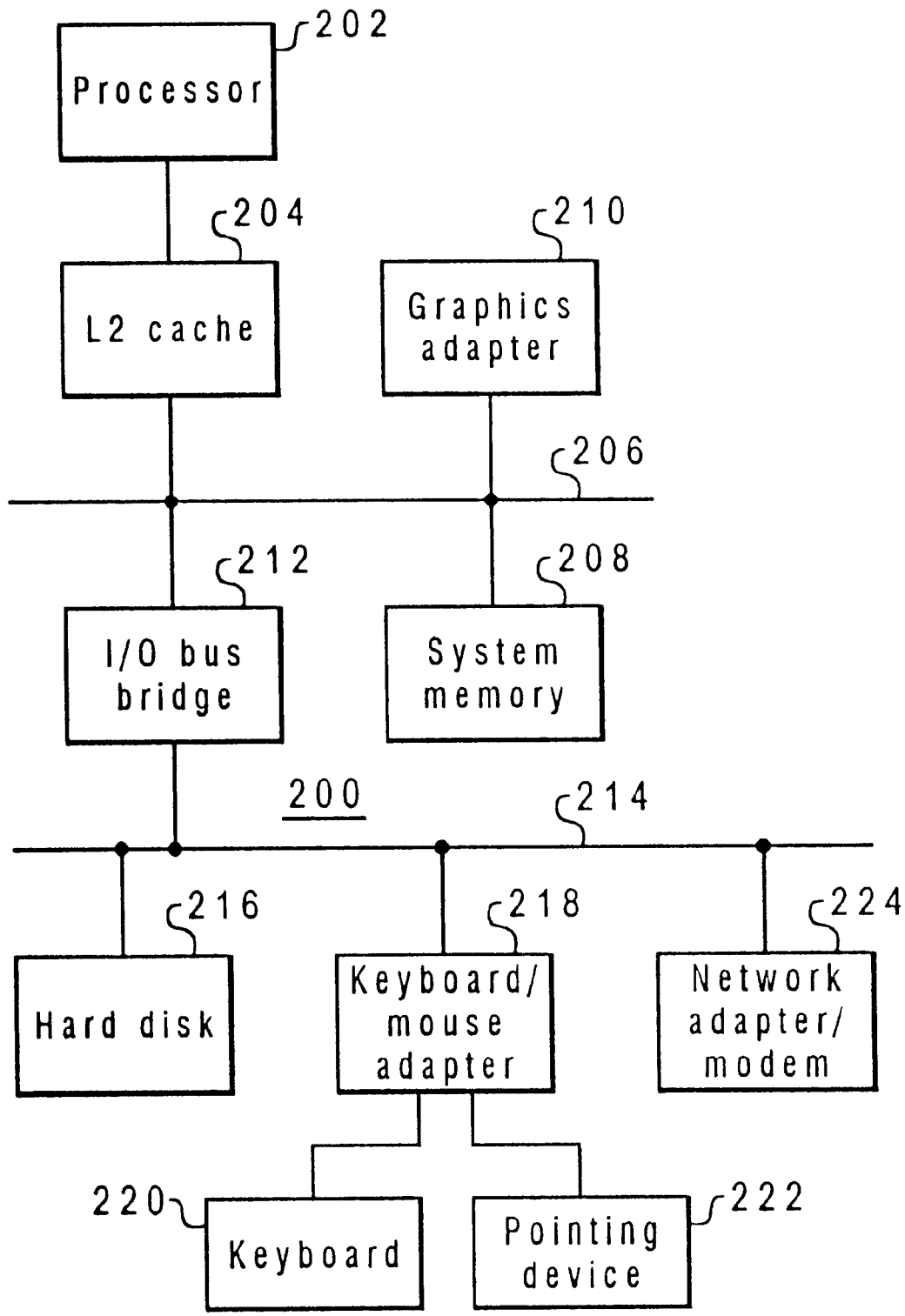
FIG. 2 is a block diagram of a data processing system utilizing mechanisms for creating and reconciling uncleared transactions in accordance with a preferred embodiment of the present invention.

Referring to FIG. 2, a block diagram of a data processing system utilizing mechanisms for creating and reconciling uncleared transactions in accordance with a preferred embodiment of the present invention is depicted. Data processing system 200 may be client 102 or server 110 depicted in FIG. 1. Data processing system 200 in the exemplary embodiment includes a processor 202, which may be a PowerPC™ processor available for International Business Machines Corporation of Armonk, N.Y. Processor 202 is connected to a level two (L2) cache 204, which is utilized to stage data to and from processor 202 at reduced access latency. L2 cache 204 is connected in turn to an interconnect or system bus 206, which is also connected, in the embodiment depicted, to system memory 208 and memory-mapped graphics adapter 210. Graphics adapter 210 provides a connection for a display device (not shown) on which the user interface of software executed within data processing system 200 is displayed.

Also connected to system bus 206 in the exemplary embodiment is input/output (I/O) bus bridge 212, which provides an interface between system bus 206 and I/O bus 214. A nonvolatile memory such as hard disk drive 216 may be connected to I/O bus 214, as may keyboard/mouse adapter 218, which provides connection to I/O bus 214 for keyboard 220 and pointing device 222. Pointing device 222 may be a mouse, trackball, or the like. Also connected to I/O bus 214 may be network adapter 224 for connecting data processing system 200 to a local area network (LAN), the Internet, or both. Those skilled in the art will appreciate that other devices may be incorporated into data processing system 200, such as an optical disk drive or a modem.

The operation of data processing systems of the type depicted in FIG. 2 is well known in the art. Program information comprising instructions and/or data is stored on nonvolatile memory 216 and may be selectively copied into system memory 208 once data processing system 200 is powered on. Processor 202 executes the instructions within such program information and generates text or graphical information for presentation on display device connected via graphics adapter 210, where the information may be viewed by a user. The user may selectively control operation of data processing system 200 through input entered on keyboard 220 or through pointing device 222. In the present invention, the software implements mechanisms for creating and reconciling uncleared transactions as described below.

Figures 3A, 3B:
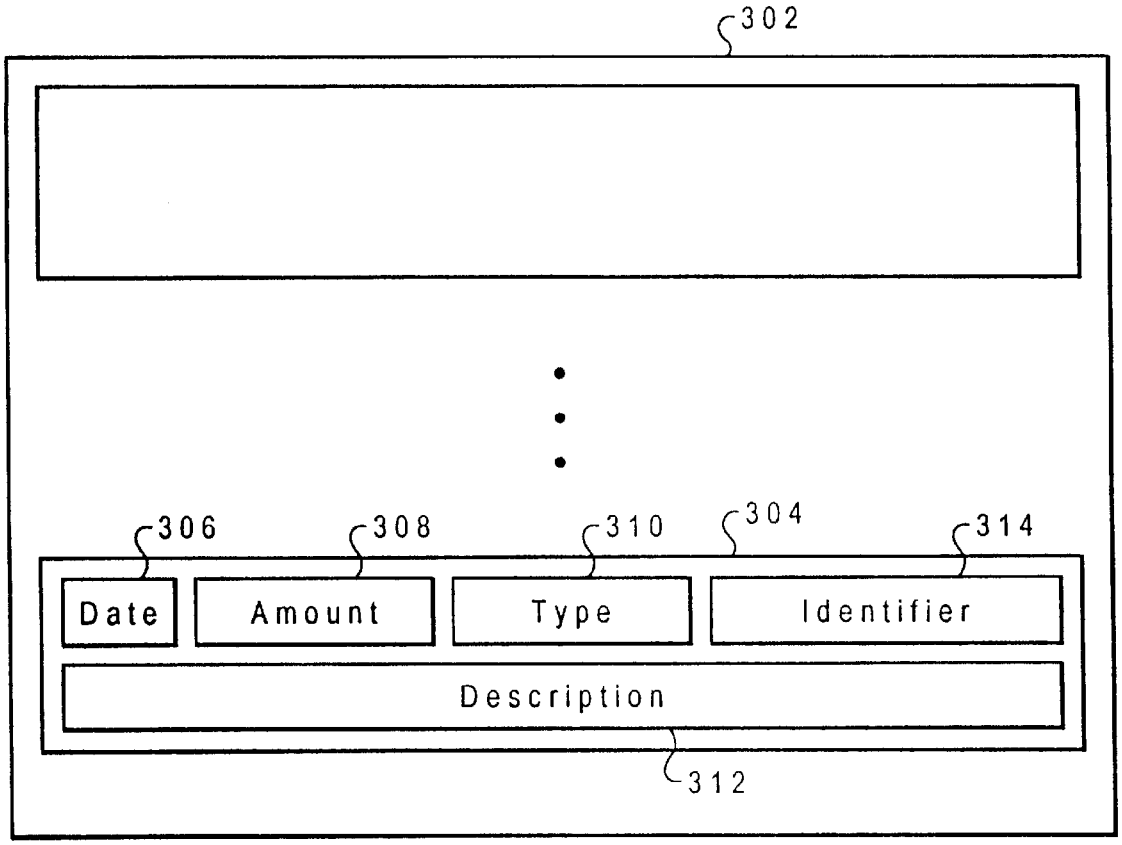
FIGS. 3A-3B depict a mechanism for creating uncleared transactions within a financial institution account ledger in accordance with a preferred embodiment of the present invention.

With reference now to FIGS. 3A-3B, a mechanism for is creating uncleared transactions within a financial institution account ledger in accordance with a preferred embodiment of the present invention is depicted. FIG. 3A is a block diagram of an account ledger for a financial institution. Account ledger 302 includes one or more uncleared transaction records 304 created by the customer. Uncleared transaction record 304 may be added to account ledger 302 by the customer and contains information similar to that found in real transactions records within the same ledger. This may include, for instance, a date field 306, an amount field 308, and a transaction type (deposit or withdrawal) field 310. Uncleared transaction record 304 also includes a description field 312 in which the customer may enter a brief narrative relating to the transaction. Uncleared transaction record 304 further includes a transaction identifier field 314 in which the customer may enter a unique transaction identifier.

When a customer wishes to prepare for a transaction, they may add uncleared transaction record 304 to account ledger 302 for their account with the financial institution. This may include a unique character string (e.g., "JWM1") in transaction identifier field 314. Uncleared transaction record 304, together with any other uncleared transaction records, is entered in the records of the financial institution but is treated by the financial institution as a comment to account ledger 302. Although they may appear in a monthly statement and/or transaction history printout, uncleared transaction records for an account are not employed in any fashion to compute the balance of the account corresponding to account ledger 302.

FIG. 3B is a pictorial representation of a deposit slip for a financial institution account supporting uncleared transactions. Deposit slip 316 includes a space 318 in which a customer may enter a transaction identifier character string. The transaction identifier entered on deposit slip 316 should correspond to the character string entered in an uncleared transaction record created by the customer in the financial institution account ledger. The transaction identifier written in the provided space 318 will be entered as an annotation to the real transaction record by a financial institution employee. Uncleared transactions may then be easily correlated to real, cleared transactions using the transaction identifier. As with check numbers on preprinted checks, preprinted deposit slips may already include a unique transaction identifier which may be employed by the customer for this purpose.

Figure 4A:
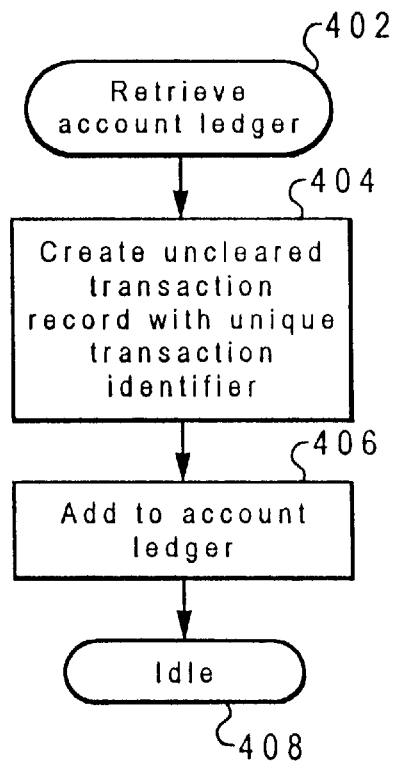
FIGS. 4A-4C are flow charts for creating uncleared transactions within a financial institution account ledger in accordance with a preferred embodiment of the present invention.
Figure 4B:
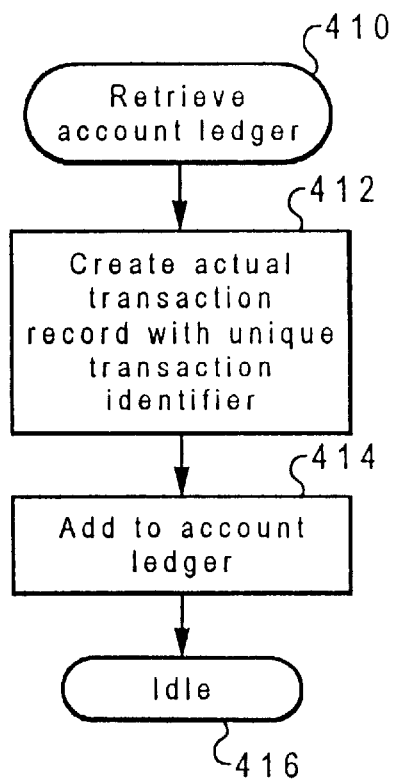
Figure 4C:
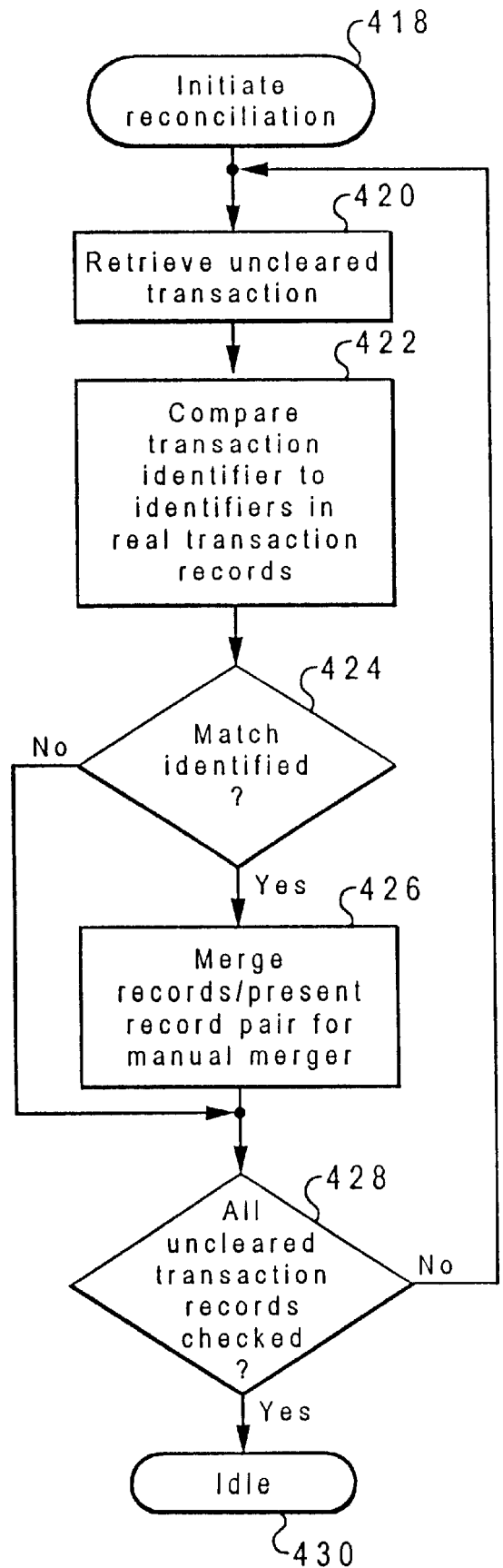

Referring to FIGS. 4A, 4B, and 4C, high level flowcharts for a process of utilizing uncleared transactions with unique transaction identifiers in accordance with a preferred embodiment of the present invention are illustrated. FIG. 4A illustrates a process of creating an uncleared transaction record in anticipation of actually making a transaction at a financial institution. The process begins at step 402, which depicts retrieving the financial institution's account ledger for the customer's account, utilizing, for example, a Java application over the Internet. The process then passes to step 404, which illustrates creating an uncleared transaction record with a unique transaction identifier, a detailed description of the transaction, and other relevant information. The process passes next to step 406, which depicts adding the uncleared transaction record to the customer's account ledger, and then to step 408, which illustrates the process becoming idle until the customer desires to create another uncleared transaction record.

FIG. 4B illustrates a process of creating an real transaction record for a transaction actually completed by the customer at the financial institution. The process begins at step 410, which depicts retrieving the financial institution's account ledger for the customer's account, and then passes to step 412, which illustrates creating an real transaction record with the unique transaction identifier provided by the customer, either directly by writing on bank forms or indirectly from a preprinted transaction identifier on the bank forms. The process passes next to step 414, which depicts adding the real transaction record to the customer's account ledger, and then to step 408, which illustrates the process becoming idle until the customer completes another actual transaction at the financial institution.

The processes of FIGS. 4A and 4B may occur in the order depicted, or in the opposite order. For example, a customer may make an ATM deposit at their financial institution and then create a corresponding uncleared transaction record to provide a means for later verifying that the deposit was properly credited to the customer's account.

FIG. 4C illustrates a process for correlating uncleared and real transaction records. The process begins at step 418, which depicts initiation of an account reconciliation process involving correlation of uncleared and real transaction pairs. The process then passes to step 420, which illustrates retrieving an uncleared transaction from the account ledger for the account being reconciled. The process passes next to step 422, which depicts comparing a transaction identifier within the retrieved uncleared transaction record to transaction identifiers within real (unreconciled) transactions for the account, and then to step 424, which illustrates a determination of whether a match of transaction identifiers was identified.

If a pair of uncleared and real transactions containing matching transaction identifiers is identified, the process proceeds to step 426, which depicts merging the records or presenting the record pair for manual merger, depending on the customer's preference. The merger of the transaction records may include appending the description from the uncleared transaction record, which contains a detailed description of the transaction, to the financial institution's description of the transaction within the real transaction record. This allows the benefit of the detailed description in the uncleared transaction record to be preserved. The uncleared transaction record is unlikely to include any other unique information of significance, except perhaps the date on which the customer entered the uncleared transaction record.

The process then passes to step 428, which illustrates a determination of whether all uncleared transaction records within the account ledger have been checked. If not, the process returns to step 420 to retrieve another uncleared transaction record for correlation. If so, however, the process proceeds instead to step 430, which depicts the process becoming idle until the next account reconciliation is initiated. If uncleared transaction records remain which have not be correlated to real transaction records, these uncleared transaction records are maintained in the account ledger for manual correlation by the customer or correlation during the next account reconciliation. Uncleared transaction records which were not correlated may appear separately in an account statement, whether printed or electronic.

The present invention permits customers to create uncleared transaction records in anticipation of making a transaction at their financial institution. Personal finance managers permit creation of such anticipated transaction records by virtue of their maintaining a separate account ledger. When the financial institution's actual ledger also becomes the customer personal ledger, however, the capability of creating transaction records for transactions which have not yet been made is no longer intrinsically present. In addition, the ability for reconciling uncleared transactions with real transactions is complicated by the occurrence or events outside the scope of the customer's control, such as deposits which require teller activity at the bank. The present invention allows unique transaction identifiers to be employed to automatically correlation transaction pairs for reconciliation.

It is important to note that while the present invention has been described in the context of a fully functional data processing system and/or network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of correlating transactions in an account ledger, comprising:

creating an uncleared transaction record within the account ledger for an anticipated transaction, the uncleared transaction including a unique transaction identifier capable of uniquely identifying any transaction including deposits, checks, and withdrawals;

creating a real transaction record within the account ledger for an actual transaction, the real transaction record including the transaction identifier;

comparing the transaction identifier within the uncleared transaction record with the transaction identifier within the real transaction record; and responsive to identifying a match between the transaction identifier within the uncleared transaction record and the transaction identifier within the real transaction record, merging the uncleared transaction record with the real transaction record.

2. The method of claim 1, wherein the step of creating the uncleared transaction record precedes the step of creating the real transaction record.

3. The method of claim 1, wherein the step of creating the real transaction record precedes the step of creating the uncleared transaction record.

4. The method of claim 1, wherein the step of comparing the transaction identifier within the uncleared transaction record with the transaction identifier within the real transaction record further comprises:

comparing the transaction identifier within the uncleared transaction record to a plurality of different transaction identifiers contained within a corresponding plurality of real transaction records including the real transaction record.

5. The method of claim 1, wherein the step of merging the uncleared transaction record with the real transaction record further comprises:

appending a transaction description within the uncleared transaction record to a transaction description within the real transaction record.

6. The method of claim 1, wherein the step of merging the uncleared transaction record with the real transaction record further comprises:

displaying the uncleared and real transaction records for manual merger.

7. The method of claim 1, further comprising:

comparing a plurality of uncleared transaction records with a plurality of real transaction records; and responsive to identifying real transaction records within the plurality of real transaction records corresponding to uncleared transaction records within the plurality of uncleared transaction records, merging each corresponding pair of uncleared and real transaction records.

8. The method of claim 7, further comprising:

performing an account reconciliation including the steps or comparing uncleared and real transaction records and merging each corresponding pair of uncleared and real transaction records.

9. A mechanism for correlating transactions in an account ledger, comprising:

a memory containing:
a plurality real transaction records within the account ledger for actual transactions relating to an account within a financial institution, each real transaction record within the plurality of real transaction records including a transaction identifier capable of uniquely identifying any transaction including deposits, checks, and withdrawals;
a plurality of uncleared transaction records within the account ledger for anticipated transactions relating to the account, each uncleared transaction within the plurality of uncleared transaction records including a unique transaction identifier matching a transaction identifier contained within a corresponding real transaction record;

a processor coupled to the memory and comparing a transaction identifier within an uncleared transaction record to a transaction identifier within a real transaction record, wherein the processor, responsive to identifying a match between the transaction identifier within the uncleared transaction record and the transaction identifier within the real transaction record, merges the uncleared transaction record with the real transaction record.

10. The mechanism of claim 9, wherein the first and second memory and the processor are contained within a server for a financial institution.

11. The mechanism of claim 10, further comprising:

a client connected to the server via an Internet connection path, the client creating the plurality of uncleared transaction records within the server.

12. The method of claim 11, wherein the client further comprises:

a display displaying a corresponding pair of uncleared and real transaction records for manual merger.

13. A computer program product within a computer usable medium, comprising:

instructions within the computer usable medium for creating an uncleared transaction record within an account ledger for an anticipated transaction, the uncleared transaction including a unique transaction identifier capable of uniquely identifying any transaction including deposits, checks, and withdrawals;

instructions within the computer usable medium for creating a real transaction record within the account ledger for an actual transaction, the real transaction record including the transaction identifier;

instructions within the computer usable medium for comparing the transaction identifier within the uncleared transaction record with the transaction identifier within the real transaction record; and instructions within the computer usable medium, responsive to identifying a match between the transaction identifier within the uncleared transaction record and the transaction identifier within the real transaction record, for merging the uncleared transaction record with the real transaction record.

14. The computer program product of claim 13, wherein the instructions for creating the uncleared transaction record are executed prior to the instructions for creating the real transaction record.

15. The computer program product of claim 13, wherein the instructions for creating the real transaction record are executed prior to the instructions for creating the uncleared transaction record.

16. The computer program product of claim 13, wherein the instructions for comparing the transaction identifier within the uncleared transaction record with the transaction identifier within the real transaction record further comprise:

instructions for comparing the transaction identifier within the uncleared transaction record to a plurality of different transaction identifiers contained within a corresponding plurality of real transaction records including the real transaction record.

17. The computer program product of claim 13, wherein the instructions for merging the uncleared transaction record with the real transaction record further comprise:

instructions for appending a transaction description within the uncleared transaction record to a transaction description within the real transaction record.

18. The computer program product of claim 13, wherein the instructions for merging the uncleared transaction record with the real transaction record further comprise:

instructions for displaying the uncleared and real transaction records for manual merger.

19. The computer program product of claim 13, further comprising:

instructions within the computer usable medium for comparing a plurality of uncleared transaction records with a plurality of real transaction records; and instructions within the computer usable medium, responsive to identifying real transaction records within the plurality of real transaction records corresponding to uncleared transaction records within the plurality of uncleared transaction records, for merging each corresponding pair of uncleared and real transaction records.

20. The computer program product of claim 19, further comprising:

instructions within the computer usable medium for performing an account reconciliation including the instructions for comparing uncleared and real transaction records and merging each corresponding pair of uncleared and real transaction records.

* * * * *